Aug. 6, 1935.  B. C. SKINNER  2,010,497
ART OF PREPARING FRESH FRUIT FOR MARKET
Filed May 18, 1929
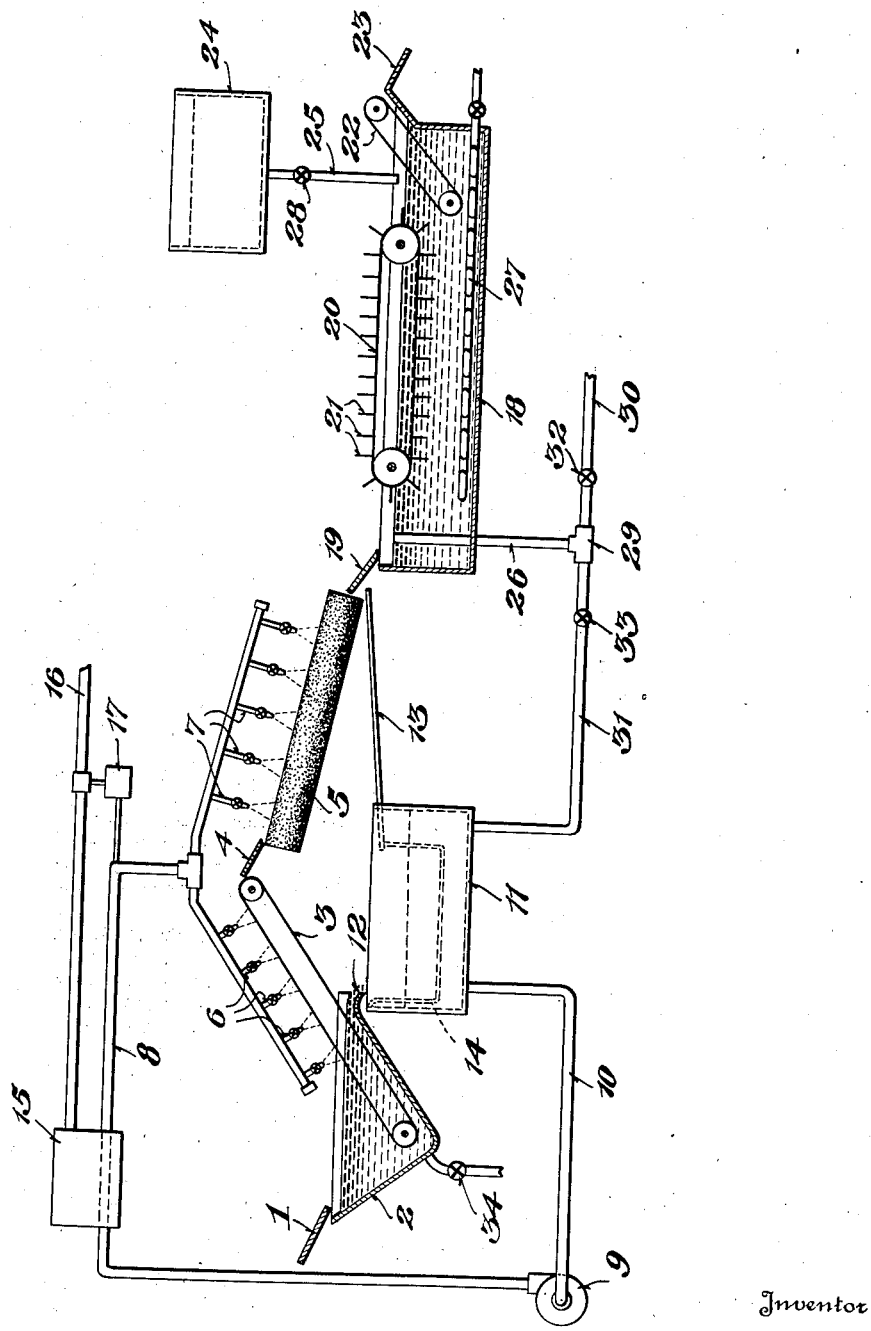
Inventor
B.C. Skinner,
By Steward & McKay
Attorneys Patented Aug. 6, 1935

2,010,497

UNITED STATES PATENT OFFICE 2,010,497

ART OF PREPARING FRESH FRUIT FOR MARKET

Bronson Cushing Skinner, Dunedin, Fla., assignor to Brogdex Company, Winter Haven, Fla., a corporation of Florida Application May 18, 1929, Serial No. 364,185

7 Claims. (Cl. 146—202)

This invention relates to the art of preparing fresh fruit for market; and in particular it relates to apparatus and processes for the treatment of fresh citrus and other fruits in the packing house in such manner as to prevent, arrest, or effectively retard decay due to rot-producing organisms of various kinds, especially decay due to blue mold (using the term "blue mold" in the generic sense in which it is used in the practical art to include green mold and the like as well as blue mold), whereby the marketable life of the fruit is materially prolonged.

Treatment of fresh fruit under proper conditions with solutions of various reagents, such as borax, sodium hydroxide and sodium carbonate or soda ash, has been found heretofore to be very effective for retarding decay due to blue mold or similar organisms. In order to render the fruit dependably resistant to blue mold decay, for example, it is important to ensure thorough impregnation with the decay-retarding agent of all surface porosities and of rind tissues that have been exposed through mechanical injuries, such as cuts, scratches, bruises or other wounds or abrasions, because it is wholly or chiefly at such points of mechanical injury, however slight, that infection can occur and blue mold can penetrate into the fruit to accomplish decay. By such impregnation, not only may development of blue mold or blue mold spores already present be effectively prevented, but substantial immunity to subsequent infection is also conferred upon the fruit.

Experience has shown that this desired thorough impregnation can be best attained by applying the mold-inhibiting or mold-retarding solution to the fruit just as it is received from the groves, that is, without first washing it in plain water. This is for the reason that by the time the fruit is ready to be put through the packing house operations, any exposed rind tissues have usually had an opportunity to dry out to a greater or less extent and are thus in condition to absorb the treating or decay-retarding solution very readily; whereas such absorption does not occur so readily if the tissues are already saturated with plain water as the result of a preceding washing. Therefore it is desirable to wash or cleanse the fruit in the first instance with treating solution. It is also highly desirable after thus washing the fruit, to maintain it in contact with treating solution for some time longer in order still further to ensure thorough impregnation of rind porosities and exposed rind tissues. Such systematic treatment necessitates employing rather large volumes of treating solution in order to handle properly the very large quantities of fruit passing daily through a modern fruit packing house of average capacity.

Initially washing the fruit with the treating solution as described, although desirable for the reasons stated, has heretofore had the serious practical disadvantage that, since the fruit as it comes from the groves ordinarily carries considerable foreign matter on its surface, such as dust, oily smudge, scale, and the like, this foreign matter accumulates in the treating solution, rendering it dark colored and turbid. While this does not interfere materially with the decay-inhibiting action if the concentration of the solution be maintained at an effective point by suitable additions of the treating reagent, it is objectionable because, unless such turbid solution is rinsed off the fruit, what remains gives the fruit a dull or gray cast detracting from the bright appearance so much desired and accordingly reducing its market value. But since it is important that a residue of the treating reagent remain in and upon the rind or skin of the fruit in order to render it dependably resistant to decay, too thorough a final rinsing is apt to lower such resistance undesirably. Hence it has been found necessary as a practical matter to replace the treating solution with fresh solution more or less frequently. As the nature of the replaced solution and other considerations often make it impractical commercially to purify it for reuse by separating the contained dirt and other foreign matter, the dirty solution is usually run to waste. This involves the loss of the dissolved decay-inhibiting agent and consequent expense which is considerable in view of the large volume of solution discarded.

Among the objects of the invention are to render the above generally described procedure more efficient and economical in use of treating reagent, and to attain certain other advantages as will more fully hereinafter appear.

In general, the process of the present invention involves applying a decay-retarding agent to fresh fruit in two successive stages. In the first of these the fruit is cleansed of dirt and other foreign matter with the aid of a washing solution containing a decay-retarding agent in effective concentration, while at the same time impregnation of rind porosities and exposed rind tissues with said agent is accomplished to a considerable extent. In the second stage the fruit is contacted with a separate body of decay-retarding solution for a further period of time, most desirably by moving the fruit through the solution while maintaining it submerged below the surface thereof. Most of the foreign matter removed from the surface of the fruit accumulates in the solution used in the first or washing treatment which usually includes rubbing the fruit with brushes. Practically the only dirt getting into the second stage solution is that contained in the relatively small amount of first stage solution adhering to the fruit when it enters the second stage solution, and this can be still further reduced, where desired, by suitably rinsing the fruit with water or with relatively clean treating solution just before it enters the second solution, and preventing the rinsings from commingling with the second solution. The second solution therefore remains comparatively clean even after large quantities of fruit have passed through it; and when the first solution becomes so dirty that it must be discarded, it may be replaced by the relatively clean second solution, the latter being replaced or restored to normal volume by means of fresh solution supplied from any suitable source. In this way the consumption of decay-retarding material is reduced to a minimum and substantial economy is effected. The solution employed in the washing stage can be used effectively even after it has become much more turbid than was permissible under the former practice because at the conclusion of the second stage of the treatment the fruit is wet only with relatively clean solution.

One of the main objects of the present invention is to provide a two-unit apparatus for the aforesaid two-stage treatment of fresh fruit having mechanically simple means automatically operating under valve control to supply the first-stage treating unit with used treating liquid from the second-stage treating unit while maintaining a supply of treating liquid in the latter unit up to the full volume required for the second-stage treatment of the fruit. For the sake of economy of operation it is desirable to use apparatus which may be satisfactorily operated with a minimum of skill or attention. Hence, while various forms of apparatus may be employed, the most desirable is one providing two treating-liquid-containing tanks and means automatically operating under valve control to replenish the first tank with used treating liquid from the second tank. It is also desirable that the apparatus be provided with means automatically operating to maintain the liquid levels in the fruit treating tanks at substantially constant heights not only during operation in treating fruit but also, so far as possible, whilst transferring solution from the second tank to the first tank. Conveniently this end is attained by providing overflows in both fruit treating tanks and a common sump to receive the discharge from these overflows. When the solution or liquid in the first fruit treating tank and sump becomes too foul for further use it is run to waste. Then an equivalent amount of fresh solution is added to the second fruit treating tank to displace, by overflow, the same amount of used solution from the second tank to the sump. Finally, the level of solution in the first fruit treating tank is brought up to the level of its overflow by pumping solution thereto from the sump. In this way the solution level in the first fruit treating tank is only below its proper level from the time of its discharge to the time it is refilled from the sump. The solution level in the second fruit treating tank is always at the desired point, even during the transfer of solution therefrom to the sump.

It is further desirable to design and operate the apparatus so that discharge of foul wash solution and replenishment by solution from the second tank takes place at the beginning or end of each day's run so that such operations become a part of the daily routine. To facilitate carrying out this procedure the apparatus is most advantageously designed to operate on a relatively small body of wash-water, so that the concentration of dirt at the end of the day's run has about reached the allowable upper limit. The entire body of wash water may then be dumped and the first tank and sump filled from the second fruit treating tank. The latter may be, and usually is, of much larger capacity than the first tank and sump combined.

While various types of apparatus may be employed, one desirable practical form that gives satisfactory results in treating oranges, for example, is shown more or less schematically and diagrammatically in side elevation in the accompanying drawing.

In using this apparatus system fruit just as received from the grower and without being first wetted with water or other non-decay-retarding liquid, is discharged over the chute board 1 into a soaking tank 2, containing a water solution of borax or other decay retarding agent of effective strength. The fruit floats along through this tank until it reaches an elevator, conventionally indicated at 3, by means of which it is lifted up out of the tank. From the elevator the fruit is discharged over the chute board 4 onto a washer 5 of any suitable type. Conveniently this washer may be of the well known cylindrical brush type.

The fruit during its passage up the conveyor and along the washer is sprayed with the treating solution through spray jets 6 and 7 arranged above the conveyor and brush rolls respectively. The solution is supplied to these spray jets by means of a pipe 8, a pump 9 and a pipe 10 from a sump 11. The solution so sprayed onto the fruit on the conveyor and brush rolls drains back into this sump, directly or indirectly. That portion sprayed onto the conveyor drains in part into tank 2 and overflows over a lip 12 on the latter into the sump. The remainder of such solution sprayed onto the conveyor drains directly into the sump. The solution draining from the washer is collected by a drip pan 13 inclined towards the sump. In some cases it may be found desirable to eliminate the tank 2 so that the preliminary treatment of the fruit prior to scrubbing is by spraying only. When tank 2 is retained, as in the example of the invention shown in the drawing, that tank and the sump both function as tank containers of the treating liquid, with the tank 2 functioning more specifically as an initial fruit soaking tank, and the tank 11 functioning not only as a sump to receive the drainage from the scrubber and the overflow from the final tank 18, but also as a container providing the immediate source of supply of treating liquid for the scrubber. When the tank 2 is eliminated, then, of course, the tank 11 functions not only as a sump but also as the only liquid-containing tank in the initial unit of the apparatus. Conveniently a screen 14 is arranged in the sump to catch the larger particles of dirt and foreign matter, which are removed from the fruit in the soaking tank and also by the brush rolls.

As it is desirable, not only for the sake of aiding the impregnation of the exposed rind tissues of the fruit by the treating solution but also to aid the cleansing action of the latter, to use heated solutions, the pipe 8 which leads from the sump to the spray jets may conveniently be passed through a steam heater 15. Steam is supplied to this heater through a pipe 16, and the amount of such steam is controlled by means of any suitable thermostatic device conventionally indicated at 17. In this way the temperature of the spray water may be kept below that which would scald or cook the fruit, whilst high enough to aid materially in the cleansing and impregnation thereof. A temperature of 115° to 120° F. is suitable for this purpose.

The fruit leaving the washer enters a second soaking tank 18 by means of a chute board 19. Arranged in this second soaking tank is a submerger device consisting of an endless conveyor 20, which is partially submerged in the treating solution and provided with outwardly projecting slats 21 which engage the fruit, force it beneath the surface of the solution in the tank and carry it slowly towards the opposite end of the tank. At the latter end of the tank, a conveyor 22 is provided for discharging the fruit onto a chute board 23 for further treatment, such as drying and coating with wax or the like. The second tank 18 is filled with a solution of the same or similar composition as that employed in the first soaking tank. Conveniently this solution is prepared in a suitable storage tank 24 from which it may be discharged into tank 18 by a pipe 25 when desired. Suitable heating means, such as a steam coil 27 may be provided for warming the solution in the tank 18.

It is permissible, within the scope of the invention, to rinse the fruit lightly just before it enters the tank 18, with either clean treating solution or clean water containing no treating reagent. The purpose of such rinsing is to remove some of the dirt still carried by the fruit, and thus reduce the amount of dirt to be removed by the final complete rinsing and soaking treatment in the tank 18. When a plain water rinse is used it may be run to waste, but when fresh treating solution is used it may drain back into the sump 11.

To enable the solution in the second treating tank 18 to be transferred to the sump 11 a pipe 26 is provided, the open upper end of which terminates at the level at which it is desired to maintain the solution within the tank 18. The lower end of pipe 26 is connected by a T 29 to pipes 30 and 31. The pipe 30 leads to the sewer or the like, while pipe 31 is connected to the bottom of the sump. Valves 32 and 33 control the flow of solution through pipes 30 and 31 respectively. By opening both valves 32 and 33 the contents of the sump may be run to waste through pipes 31 and 30. At the same time the tank 2 is drained by opening a valve 34. If the valve 32 is then closed and the valve 28 in the pipe 25 leading from the fresh borax solution tank 24 to the tank 18, is opened then the solution in the latter overflows down pipe 26, through pipe 31 into the sump. In this way the treating solution in the tank 18 is replenished and an equivalent amount of solution transferred to the sump 11. The tank 2 is refilled from the latter by pump 9, discharging through those spray jets 6 which are above the tank 2, the other jets being conveniently closed by their respective valves.

With the arrangement described the level of the treating solution in the two tanks 2 and 18 respectively is automatically maintained at the desired height during operation by the provision of the overflow lip 12 and pipe 26. The liquid level in the sump need not be maintained at any particular fixed height as the action of the apparatus is not dependent in any way thereon. It will further be observed that even while transferring solution from the tank 18 to the sump 11 the solution level in the tank 18 is always at the desired height, since, as fast as fresh solution is run into the tank 18 from the fresh solution tank 24, used solution runs out of the tank at the same rate through the overflow pipe 26.

The strength or concentration of the treating solutions and also their temperature may be varied considerably within reasonable limits. By way of example, merely, I might state that excellent results have been obtained by the use of solutions containing about 3 or 4 per cent of borax or corresponding amounts of other reagents at a temperature of about 115° to 120° F. or thereabouts in both treatment tanks. Fruit treated with any of the solutions hereinabove described should be subjected to the action of the solution for a sufficient time to allow absorption of an effective quantity of mold-inhibiting reagent. The purpose of the treatment is quite as much to confer subsequent immunity to molds as to prevent the development of molds or mold spores already on the fruit. This subsequent immunity depends on the presence in or on the rind of the fruit of a sufficient quantity of the reagents used. Where warm and fairly strong treating solutions are used, it is usually sufficient for the fruit to remain in the tanks for a total period of five to ten minutes. Where cooler and/or less concentrated solutions are used a longer soaking period is advantageous.

What is claimed is:

1. Fruit treating apparatus comprising treating liquid containing means comprising a soaking tank having an overflow device by which the liquid level is maintained constant in said tank and a sump for holding treating liquid, in excess of that required to fill the soaking tank to overflowing, and arranged to receive the overflow directly from said tank, whereby a constant level may be maintained in the soaking tank with considerable variation in the volume of treating liquid used, means for introducing fruit into said tank, an elevator for lifting fruit out of said tank, means for spraying treating liquid onto the fruit on said elevator, the liquid so sprayed draining back into the soaking tank, and means for transferring liquid from the sump directly to said spraying means, a second tank, means for advancing the fruit from said elevator into said second tank, and an overflow device in said second tank arranged to discharge to said sump.

2. Fruit treating apparatus comprising treating liquid containing means comprising a primary tank and a secondary tank, each having an overflow device by which the liquid level is maintained constant therein, and a sump for holding treating liquid in excess of that required to fill both tanks to overflowing and arranged to receive the overflow separately from both of said tanks, whereby constant levels may be maintained in said tanks with considerable variation in the volume of treating liquid used, means for feeding fruit to said primary tank and therefrom to said secondary tank to thereby subject the fruit to the treating liquids successively in said primary and secondary tanks, means for replenishing the first tank with liquid from the sump, and means for replenishing the second tank with fresh liquid.

3. Fruit treating apparatus as in claim 2 in which the total liquid-containing capacity of the first tank and the sump is substantially smaller than that of the second tank.

4. Fruit treating apparatus as defined in claim 6 and in which said overflow device has its entrance mouth disposed in the fruit-receiving end portion of said tank, said means for supplying fresh treating liquid to said tank delivers said liquid into said tank at the fruit-delivery end of said tank and said means for advancing fruit through the body of liquid in said tank comprises an endless belt device with fruit-engaging elements having a path of travel in said body of liquid between said entrance mouth of said overflow device and the delivery point of said treating-liquid-supply means whereby the fruit receives the final portion of its treatment in said tank in relatively fresh treating liquid and said overflow device delivers used treating liquid.

5. Apparatus for treating fresh fruit and the like with a decay-retarding agent comprising in combination, two tanks, one of substantially smaller capacity than the other, providing separate bodies of a treating liquid of relatively small and large volumes containing a decay-retarding agent in solution when said treating liquid is supplied to said tanks, means for supplying said treating liquid to said tanks, means for scrubbing fresh fruit with treating liquid and means for circulating treating liquid between said smaller tank and said scrubbing means whereby the fruit may be scrubbed with said smaller volume of treating liquid to remove foreign matter from the surface of said fruit and to impregnate exposed rind tissue and surface porosities with said decay-retarding agent, means for transferring fruit from said scrubbing means into the larger body of treating liquid provided by said other tank and for submerging said fruit in and advancing the same in submerged condition through said body of liquid for further impregnation of said fruit with said decay-retarding agent, and means for draining treating liquid from said smaller tank, said means for supplying said treating liquid to said tanks comprising valve controlled liquid supply means for said larger tank and valve controlled liquid discharge means leading from said larger tank to said smaller tank automatically cooperating when the valves are open to supply said larger tank with fresh treating liquid to a predetermined level providing said body of liquid in said larger tank and to replenish said smaller tank with treating liquid from said larger tank without diminution of the volume of said liquid body in said larger tank.

6. Fruit-treating apparatus comprising, in combination, means for scrubbing fruit with a treating liquid, a fruit-treating tank in the line of advance of fruit from said scrubbing means and adapted to contain a body of treating liquid for the submergence of the fruit therein, means for supplying fresh treating liquid to said fruit-treating tank, means for advancing fruit from said scrubbing means to said fruit-treating tank and through the body of liquid therein, a circulatory system for said scrubbing means comprising a pump, said circulatory system being of a total liquid-containing capacity substantially less than that of said fruit-treating tank to enable utilization in said scrubbing means of a relatively small body of treating liquid by repeated circulation of said liquid therethrough independently of said tank, and means for supplying said circulatory system with used treating liquid from said fruit-treating tank comprising an overflow device for said fruit-treating tank providing a predetermined liquid level therein sufficient to maintain said first-mentioned body of treating liquid therein for said submergence treatment of the fruit in said tank and operative when said liquid rises above said level to discharge excess liquid from said tank directly into said circulatory system on the inlet side of said pump.

7. Fruit-treating apparatus comprising, in combination, means for scrubbing fruit with a treating liquid, a fruit-treating tank in the line of advance of fruit from said scrubbing means and adapted to contain a body of treating liquid for submergence of the fruit therein, means for supplying fresh treating liquid to said fruit-treating tank, means for advancing fruit from said scrubbing means to said fruit-treating tank and through the body of liquid therein, a circulatory system for said scrubbing means comprising a liquid-receiving tank disposed out of the path of travel of fruit through the apparatus and at a level to receive liquid draining from said scrubbing means and pump means connecting said liquid-receiving tank with said scrubbing means to supply the latter with treating liquid, said circulatory system being of a total liquid-containing capacity substantially less than that of said fruit-treating tank to enable utilization in said scrubbing means of a relatively small body of treating liquid by repeated circulation of said liquid therethrough, and means for supplying said circulatory system with used treating liquid from said fruit-treating tank comprising an overflow device for said fruit-treating tank arranged to discharge directly into said liquid-receiving tank of said circulatory system.

BRONSON CUSHING SKINNER.